United States Patent [19]

Larson

[11] 4,404,847

[45] Sep. 20, 1983

[54] FUEL SUPPLY CONDITIONING AND FLOW MEASUREMENT CIRCUIT

[75] Inventor: Larry A. Larson, Washington, Ill.

[73] Assignee: Caterpillar Tractor Co., Peoria, Ill.

[21] Appl. No.: 294,760

[22] PCT Filed: Aug. 7, 1981

[86] PCT No.: PCT/US81/01057

§ 371 Date: Aug. 7, 1981

§ 102(e) Date: Aug. 7, 1981

[87] PCT Pub. No.: WO83/00555

PCT Pub. Date: Feb. 17, 1983

[51] Int. Cl.[3] .............................................. G01M 15/00

[52] U.S. Cl. ...................................... 73/119 A; 73/113

[58] Field of Search ...................... 73/113, 119 A, 168

[56] References Cited

U.S. PATENT DOCUMENTS

| | | | |
|---|---|---|---|
| 2,747,555 | 5/1956 | Brunner | 123/32 |
| 3,577,776 | 5/1971 | Brown | 73/119 A |
| 3,750,463 | 8/1973 | Erwin, Jr. | 73/113 |
| 3,831,439 | 8/1974 | Konomi | 73/113 |
| 3,973,536 | 8/1976 | Zelders | 123/136 |
| 4,134,301 | 1/1979 | Erwin, Jr. | 73/113 |

OTHER PUBLICATIONS

Jennings, R. Fuel Economy Measurement . . . Transducers from Proceedings of 22nd International Instrumentation Symposium, 1976, pp. 193–203.

*Primary Examiner*—Jerry W. Myracle
*Attorney, Agent, or Firm*—Wood, Dalton, Phillips, Mason & Rowe

[57] ABSTRACT

A fluid conditioning and flow measurement circuit (10) for testing a fuel injection apparatus (12,20). The circuit (10) has a reservoir (58) communicating with a pump (22) which supplies fuel to the injection apparatus (12,20) the flow of which is measured by a calibrated flow meter (44). A first deaeration apparatus (38) communicating with the discharge side (24) of the pump (22) removes entrained and dissolved air in cooperation with a relief valve (36). A second deaeration apparatus (56) in cooperation with the testing apparatus (12,20) further removes entrained and dissolved air thereby enabling accurate flow measurements to be made by the flow meter (44).

18 Claims, 1 Drawing Figure

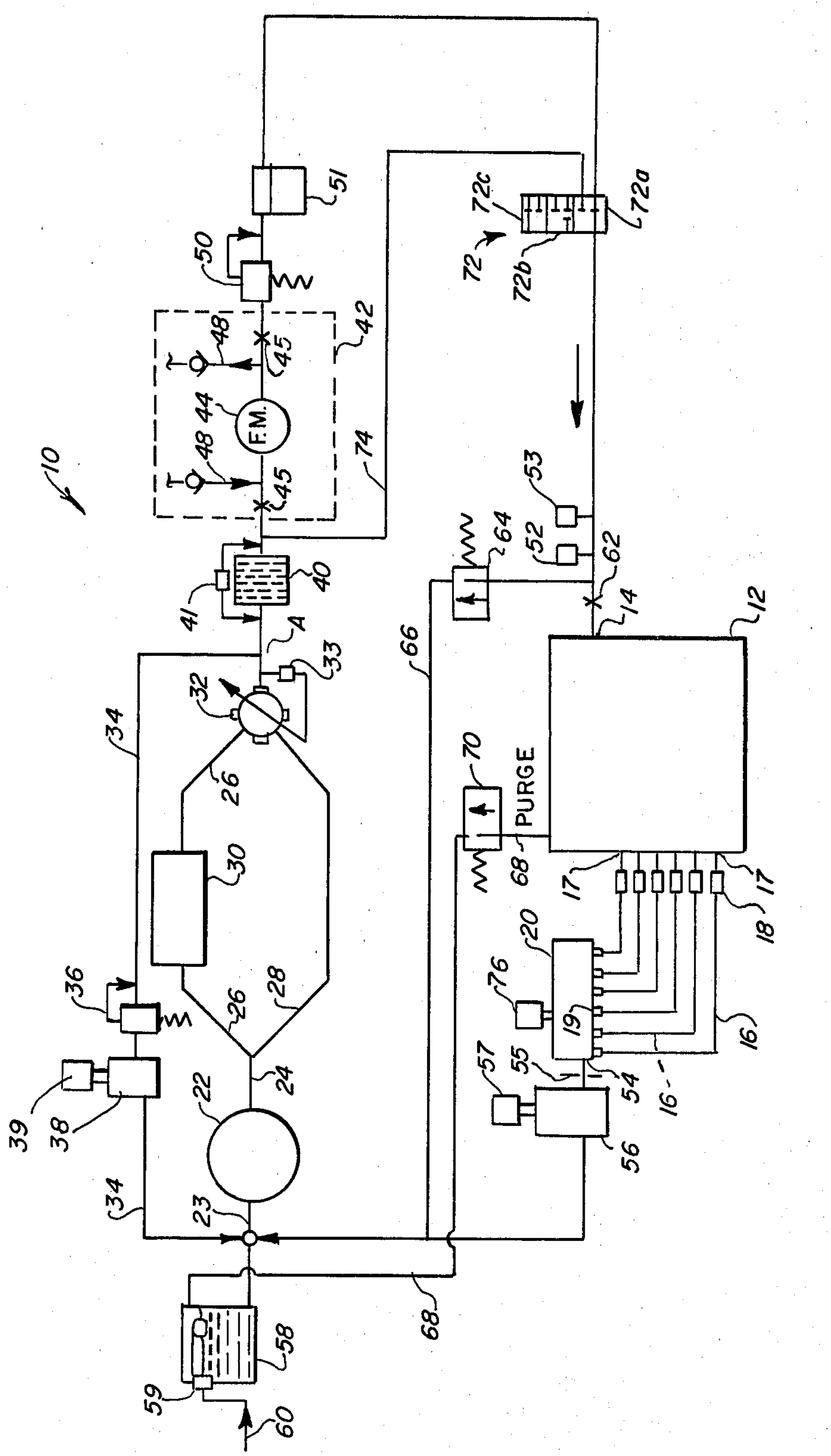
F.M.
PURGE

FUEL SUPPLY CONDITIONING AND FLOW MEASUREMENT CIRCUIT

DESCRIPTION

1. Technical Field

This invention relates generally to circuits wherein fluid flow is required to be accurately measured, more particularly, this invention relates to circuits for testing fuel injection system components.

2. Background Art

Circuits for measuring fluid flow generally and, more particularly, circuits which circulate and measure the flow of fuel to test injection pumps, such as diesel injection pumps, have not kept pace with the stringent demands of research and development and governmental requirements wherein accurate flow measurement is imperative. Typically, flow measurement circuits not only achieve flow measurement accuracies within ±7% of the actual flow.

In attempting to achieve accurate flow measurements, numerous circuits have been developed which recognize the importance of and strive toward conditioning fuel so that accurate and meaningful flow measurements can be taken. Conditioned fuel is fuel at a standard, constant temperature and pressure and which is relieved of objectionable air entrained or dissolved within the fuel. Once the fuel has been conditioned, accurate and repeatable flow measurement can be made.

One type of such a flow circuit is exemplified by U.S. Pat. No. 3,973,536 issued Aug. 10, 1976 to Wim Zelders. This flow circuit has pressure and temperature controls and overpressurizes the circuit to prevent air entrained in the fuel from becoming disentrained. The drawbacks of this type of circuit are that:

(1) Dissolved air tends to dissociate to form bubbles of entrained air as the pressure drops at flow discontinuities such as elbows, valve ports, and flow control orifices. When dissolved air has dissociated, the fuel becomes a mix of compressible and incompressible parts. This destabilizes the volumetric efficiency of pumps and flow meters with loss of repeatability and accuracy.

(2) No dampening is provided to dampen pulses in the fuel generated by the operation of the injection pump thereby subjecting the flow meter to these pulsations which possibly could damage the flow meter and contributes to the inaccuracy and lack of repeatability of the flow meter.

(3) No apparatus is provided whereby a newly inserted test injection pump can be purged of trapped air prior to testing thereby preventing entrainment of more air.

And (4), while the temperature control provides equalization of fuel temperature, it does not provide a mechanism to hold fuel at a specific, standard temperature resulting in the passing of fuel of differing density through the flow meter as the temperature of the fuel fluctuates over a period of time.

Another type of flow measuring circuit is described in U.S. Pat. No. 3,750,463 issued Aug. 7, 1973 to Curtis L. Erwin, Jr. This circuit does have means to disentrain air within the fuel, however, the means are located downstream of the flow meters thereby still subjecting the flow meters to the compressible flow caused by entrained air. Further, no pressure or temperature controls nor pulsation dampening are provided which would enable the circuit to pass through the flow meter a fuel that has been conditioned and which will not subject flow meters to troublesome fuel pulsations.

The present invention is directed to overcoming one or more of the problems as set forth above.

DISCLOSURE OF THE INVENTION

In one aspect of the present invention a fuel supply flow measuring circuit is provided for testing a fuel injection apparatus. The circuit has a fuel reservoir, a pump communicating with the reservoir for supplying fuel to the injection apparatus, means for measuring the flow of fuel supplied to the injection apparatus, and means for controlling the pressure of the supply fuel to the injection apparatus. In particular the circuit has means for removing entrained air from the fuel which includes a first deaeration means interposed between the pump and the injection apparatus and a second deaeration means located downstream of the injection apparatus for removing entrained air from the fuel leaving the injection apparatus.

BRIEF DESCRIPTION OF THE DRAWING

The drawing shows one embodiment of the present invention wherein a novel fuel supply conditioning and flow measurement circuit is applied to diesel fuel.

BEST MODE FOR CARRYING OUT THE INVENTION

Turning to the drawing, an embodiment of the flow measurement circuit of this invention is shown generally as 10. The circuit 10, as described in more detail below, supplies conditioned diesel fuel to a test injection apparatus 12 having a disconnectable inlet 14. An exemplary test injection apparatus would be a series of cam driven fuel injection pumps. For test purposes, the cam is rotated by a motor (not shown) which causes the individual injector pumps to pump and to boost the pressure of the fuel which enters the pump at an entry pressure at the inlet 14 and exits the injector pumps at an injection pressure substantially higher than said entry pressure. From each injector pump within the test injection apparatus 12 the high pressure fuel enters injection conduits 16 which are coupled to the test injection apparatus 12 by couplers 17 in such a manner as to be easily connected and disconnected thereby allowing for easy interchange of test injection apparatus 12. In each of the injection conduits 16 is a timing and duration transducer 18 which measures the output parameters of the injection apparatus 12. Each injector conduit 16 terminates at a precalibrated fuel injector valve 19 which is connected to a gallery 20 functioning as a receptacle for the injected fuel. As exit orifice 55 at a gallery outlet 54 of the gallery 20 and a plurality of dampening accumulators 76 (only one shown) communicating with the reception chamber in the gallery 20 combine to dampen the pressure waves and smooth the flow of the fluid leaving the gallery 20. It should be noted that if the test injection apparatus 12 is for an engine having more cylinders than the six shown in the drawing, more fuel injection valves 19, injection conduits 16, couplers 17 and transducers 18 will be required. Additionally, a gallery reflecting the additional number of conduits would be substituted in place of the gallery 20 shown.

The circuit 10, to provide an initial fuel supply or make-up fuel, as when injection apparatus 12 are interchanged, has an elevated reservoir 58. A float valve 59 in a fill line 60 connected to the plant fuel distribution system maintains the reservoir 58 at a predetermined fuel level.

To supply fuel for testing the injection apparatus 12, a circulating pump 22 is provided. The pump 22, preferably a constant volume pump, such as a gear-type pump, has a suction side 23 communicating with the reservoir 58, supplying low, constant pressure fuel to the pump 22 and has a discharge side 24 discharging higher pressure fuel from said pump 22. For reasons which will become apparent hereinafter, the pump 22 is sized to supply an excess of fuel, as for example ten times the demand of the test injection apparatus 12. The 90% overcapacity, as described below, will be deaerated and recirculated back to the suction side of the pump 22.

High pressure fuel passing through the discharge side 24 is split to a sidestream 26 and a mainstream 28. The sidestream 26 routes a portion of the fuel through an interposed refrigerated cooler 30. Leaving the cooler 30, the cool fuel in the sidestream 26 enters a mixing valve 32 as does the remainder of fuel passing through the mainstream 28.

The mixing valve 32, via a thermostat 33, controls the temperature of the fuel by controlling the ratio of cool fuel, and thereby the flow of fuel through the cooler 30, to the remaining fuel flowing through the mainstream 28. In this manner the fuel leaving the mixing valve 32 will be at a constant standard temperature.

Passing from the mixing valve 32 the fuel is routed to a point in the circuit 10 designated by A. At point A, approximately 90% of the fuel delivery from the pump 22 plus any fuel not demanded by the injection apparatus 12 passes through a recirculation line 34 which is connected to the pump suction side 23. Interposed in the recirculation line 34 is a pressure relief valve 36 and a first deaerator 38. The relief valve 36 throttles flow to control the pump 22 discharge pressure at point A. Fuel passing through the throttling relief valve 36 experiences positive and negative pressure waves which cause a partial evolution of dissolved air into bubbles of entrained air. The mix of fuel and entrained air then enters the first deaerator 38 which purges the entrained air from the fuel through air vent 39. The fuel, now having the entrained and a portion of the dissolved air removed by the first deaerator 38, enters the suction side 23 of the pump 22. With the recirculation of the 90% overcapacity through the first deaerator 38 all the fuel in the circuit 10 eventually passes through and is deaerated by the first deaerator 38 thereby minimizing flow measurement inaccuracies caused by fuel having entrained and saturated dissolved air which might evolve from solution at any flow discontinuity such as an orifice, piping elbow or fitting.

The remainder of the fuel not passing through recirculation line 34 (i.e., fuel required by the injection apparatus 12) is routed from point A through a filter 40 to remove particulate matter carried by the fuel. Instrumentation to measure the differential pressure across the filter 40, such as a pressure differential indicator 41, is provided in order to determine when the filter 40 needs to be changed.

Leaving the filter 40, the fuel passes through a flow measuring station 42. Within the flow measuring station 42 is a flow meter 44, measuring fuel flow to the injection apparatus 12, which can be isolated by a pair of block valves 45 from the rest of the circuit 10. Disposed on either side of the flow meter 44 between the flow meter 44 and the block valves 45 are a pair of quick disconnect calibration lines 48. The calibration lines 48, when the flow meter 44 is isolated, direct a flow of fuel from a suitable apparatus (not shown) through the flow meter 44 providing an in situ method to calibrate said flow meter 44. Scheduled calibration of the flow meter 44 insures accurate measurement of the flow of fluid passing therethrough.

The fuel leaving the flow measuring station 42 passes through a conventional pressure control valve 50. The pressure control valve 50 controls the pressure of the circuit 10 downstream to the desired pressure at the inlet 14.

Downstream of the pressure control valve 50 is a conventional pulsation dampener 51. The operations within the test injection apparatus 12 (i.e., pumping, injecting) creates pressure pulses in the fuel which travel upstream toward the flow meter 44. By providing for the dampening of these pulses, the flow meter 44 is protected against possible damaging pulses. Further, the accuracy of the flow meter 44 is improved since the fluctuations in flow caused by the pressure pulses do not reach and affect the flow meter 44.

Passing from the pulsation dampener 51 the fuel is directed to a three position selector valve 72. Also communicating with the selector valve 72 is a high pressure line 74 which is connectively interposed between the filter 40 and the flow measuring station 42. In the position shown in the drawing a ported first section **72*a* of the selector valve 72 blocks flow in the high pressure line 74 while allowing the flow of the low pressure fuel from the control valve 50 to pass therethrough for operative testing of the injection apparatus 12. Movement of the selector valve 72 to a second position disposes the ported second section 72*b* to block all lines connected to the selector valve 72 and to isolate the injection apparatus 12. Placement of the selector valve 72 in the third position brings the ported third section 72*c* into position blocking fuel from the pressure control valve 50 and passing the high pressure fuel therethrough to pressurize the injection apparatus 12. Once the injection apparatus 12 has been shut-off and pressurized, the selector valve is placed so that the blocking second section 72*b* isolates the injection apparatus 12. When isolated, the time based decay of pressure within the injection apparatus 12** is measured to determine possible leakage faults therein.

Passing from the selector valve 72, the pressure and temperature of the fluid are measured by a pressure indicator 52 and temperature indicator 53. Thereafter the fuel is directed to the inlet 14 of the test injection apparatus 12.

Leaving the gallery 20 at its outlet 54 the fluid enters a second deaerator 56 which acts to relieve the fuel of air evolved during injection. Injection into the gallery 20 often results in the formation of large number of small bubbles of entrained air as numerous large positive and negative pressure waves, somewhat attenuated by the accumulators 76 and orifice 55, are created in said gallery 20. The second deaerator 56 reduces the velocity of the incoming fluid such that the bubbles of entrained air may rise and be exhausted by an automatic air vent 57.

Fuel passing from the second deaerator 56 is directed to the suction side 23 of the pump 22. In this manner the circuit 10 is operated as a pressurized closed loop system thereby avoiding contact with the atmospheric reservoir 58 and lessening the opportunities for the entrainment of air into the fuel.

In order to replace the test injection apparatus 12 with another test injection apparatus, the flow of fuel to the test injection apparatus 12 is stopped by the closure of a quick disconnect valve 62. Concurrent with the closure of the quick disconnect valve 62, a manual or automatically controlled injector bypass valve 64 disposed in a bypass line 66 is opened such that fuel passes through the bypass line 66 and to the suction side 23 of the pump 22. In this fashion, the flow of fuel through the bypass line 66 maintains the temperature of the circuit 10.

Prior to testing, it is advantageous to purge the air from the test injection apparatus 12. Opening the quick disconnect valve 62 and closing the bypass valve 64, fuel enters the test injection apparatus 12. Manually or automatically opening a purge valve 70 permits a fuel/air mixture to flow through the purge line 68 into the reservoir 58. The fuel used in purging the air is returned to the reservoir 58 rather than into the suction side 23 of the pump 22 since the air being removed from the test injection apparatus 12 would become entrained or dissolved in the fuel in the circuit 10 and would have to be removed. Once purging is completed the purging valve 70 is closed. Thereafter, the fuel is circulated through the test injection apparatus 12 and testing is initiated.

INDUSTRIAL APPLICABILITY

To operate the above described circuit 10 to test a fuel injection apparatus 12 such as a diesel fuel injection pump, fuel is discharged by the pump 22 at, for example, 5.62 Kg/cm$^2$ (80 PSIG). The pump 22, to provide adequate recirculation for deaeration, should have approximately a 90% overcapacity.

The fuel discharged by the pump 22 is stabilized by the combined effects of the cooler 30 and mixing valve 32 to a standard, constant temperature of, for example, 72° F. (22.2° C.). This temperature is advantageous in that it approximates the ambient temperature of the test environment thereby dispensing with the need for elaborate insulation.

At point A the 90% overcapacity of fuel enters into a recirculation loop around the pump 22. In the recirculation line 34 the pressure relief valve 36, set at 5.62 Kg/cm$^2$ (80 PSIG) throttles to maintain the pressure at point A approximately at said set pressure. The fuel passing through the relief valve 36 enters the first deaerator 38 whereupon entrained air is purged from the fuel through air vent 39. Thereafter, the fuel free of entrained air re-enters the suction side 23 of the pump 22.

The remaining fuel not recirculated around the pump 22 is the quantity of fuel demanded by the injection apparatus 12. Passing through the particulate filter 40 for removal of particulate matter, the fuel flows through the flow measuring station 42. At the flow measuring station 42 resides a previously, in situ calibrated, flow meter 44 which accurately measures the flow of fuel passing therethrough.

From the flow meter 44 the fuel proceeds through the pressure control valve 50 which controls the downstream pressure of the fuel (i.e., fuel supplied to the injection apparatus 12) to a pressure of, for example 2.46 Kg/cm$^2$ (35 PSIG). Thereafter the fuel enters a pulsation dampener 51 where pressure pulses from the injection apparatus are dampened. The fuel passes through the selector valve 72 and proceeds on to and flows through the injection apparatus 12, injector conduits 16, and gallery 20.

Fuel is injected into the gallery 20 in bursts which cause large positive and negative pressure oscillations. The combination of accumulators 76 and the exit orifice 55 smooth the flow velocity and pressure waves. The fuel enters the second deaerator 56 at essentially pump inlet pressure wherein dissolved air in the high pressure injection fuel which enters the collector gallery 20, transformed to entrained air bubbles by negative pressure waves, is collected and removed. Leaving the second deaerator 56 the fuel is returned to the suction side 23 of the pump 22 thereby completing the closed-loop circuit 10.

The level controlled reservoir 58 is elevated above and communicates with the suction side 23 of the pump 22 to supply make-up fuel to and provide a suction head for the pump 22.

To test the injection apparatus 12 for leakage, the selector valve 72 is positioned such that the third module 72*c* blocks the flow of 2.46 Kg/cm$^2$ (35 PSIG) fuel and passes the 5.62 Kg/cm$^2$ (80 PSIG) fuel through the high pressure line 74 to the injection apparatus 12. When injection apparatus 12, which is not operating during the leak test, is pressurized, the selector valve 72 is positioned such that the second module 72*b* isolates the injection apparatus 12. With the selector valve 72 so positioned all the fuel in the circuit 10 is recirculated through the first deaerator 38. The isolation of the pressurized injection apparatus 12 permits the decay of pressure to be measured by the pressure indicator 52 which, in turn, determines if excessive leakage occurs.

To change the injection apparatus 12 to be tested, the isolation valve 62 is closed and the bypass valve 64 is opened. While the interchange is made, fuel is continually circulated through the circuit 10 to maintain a constant circuit temperature. For this reason the isolation valve 62 should be as close as possible to the inlet 14 of the injector apparatus 12. Next the injector conduits 16 at couplers 17, the inlet 14 and the purge line 68 are disconnected so that the injection apparatus 12 can be interchanged. Upon reconnecting the injector conduits 16, the inlet 14 and the purge line 68, the quick disconnect valve 62 is opened and the bypass valve 64 is closed. Thereafter, upon opening the purge valve 70, fuel entering the injection apparatus 12 purges the trapped air therefrom and carries it with the fuel to the reservoir 58. After purging, the injection apparatus 12 is ready for testing.

It has been found advantageous to size the piping of the circuit 10 such that any air bubbles are carried in suspension for ultimate disposal at either the first or second deaerator. A flow velocity of 25.4 cm/sec (10 in/sec) has been found to be suitable for this purpose.

Other aspects, objects and advantages of this invention can be obtained from a study of the drawings, the disclosure and the appended claims.

I claim:

1. In a fuel supply flow measuring circuit (10) to test a fuel injection apparatus (12), said circuit (10) having a fuel reservoir (58), a pump (22) having a suction side (23) communicating with said reservoir (58) and a discharge side (24) supplying fuel to the injection apparatus (12), means (44) for measuring the flow of fuel supplied to the injection apparatus (12) and means (50) for controlling the pressure of the supply fuel to the injection apparatus (12), the improvement comprising:

a recirculation line (34) bypassing said flow measuring means (44) and said injection apparatus (12) and connecting the pump discharge side (24) and the pump suction side (23), said recirculation line (34) adapted for recirculating a predetermined proportion of fuel flow from the pump discharge side (24) to the pump suction side (23); and a deaeration means (38) for removing entrained air from the fuel, said deaeration means (38) positioned in said recirculation line (34).

2. In the circuit (10) described in claim 1 the improvement further comprising:

means (30,32) for controlling fuel temperature in the circuit (10), said temperature control means (30,32) being located upstream of said flow measuring means (44) between the pump discharge side (24) and the recirculation line (34).

3. In the circuit (10) described in claim 2 wherein said temperature control means (30,32) includes means (30) for separating and cooling a quantity of fuel delivered from the pump discharge side (24) and valve means (32) for variably mixing the cooled fuel with the remaining fuel delivered by the pump (22) and thereby conditioning the fuel in the circuit (10) to a constant standard temperature.

4. In the circuit (10) as described in claim 1, the improvement further comprising means (45,48) for selectively blocking or opening fluid communication between the flow measuring means (44) and the rest of the circuit (10) and enabling an in situ calibration of said flow measuring means (44).

5. In the circuit (10) described in claim 1 the improvement further comprising pressure wave dampening means (51) for dampening the reflecting pulsed fuel pressure waves generated by the injection apparatus (12), said pressure wave dampening means (51) being interposed in the circuit (10) downstream of the pump (22) between the flow measuring means (44) and the injection apparatus (12).

6. The circuit (10) described in claim 1 wherein said deaeration means includes a first deaeration means (38) positioned in said recirculation line (34) and further including a second deaeration means (56) located downstream of said injection apparatus (12), said second deaeration means (56) communicating with the suction side (23) of the pump (22) and bypassing said fuel reservoir (58).

7. The circuit (10) described in claim 1 further including a bypass line (66) interconnected between said circuit (10) upstream of said injection apparatus (12) and said suction side (23) of said pump (22) to bypass said injection apparatus (12) and permit said injection apparatus (12) to be isolated and removed.

8. In a fuel supply flow measuring circuit (10) to test a fuel injection apparatus (12) said circuit (10) having a fuel reservoir (58), a pump (22) communicating with said reservoir (58) and circulating fuel throughout said circuit (10), a flow meter (44) for measuring the flow of fuel supplied to the injection apparatus (12) and means (50) for controlling the pressure of the supply fuel to the injection apparatus (12), the improvement comprising:

testing means (18) for testing the output characteristics of the injection apparatus (12);

means (17) for coupling and uncoupling said testing means (18) to the injection apparatus (12);

means (20) for collecting fuel exiting from said testing means (18);

a first deaerator (38) communicating with the discharge side (24) of said pump (22) for removal of entrained air; and a second deaerator (56) to deaerate the fuel discharged by said collecting means (20).

9. In the circuit (10) as described in claim 8 wherein said collecting means (20) is a gallery (20).

10. In the circuit (10) as described in claim 8 the improvement further comprising means (30,32) for controlling the temperature of the fuel.

11. In the circuit (10) as described in claim 8 the improvement further comprising means (64,66) for bypassing said injection apparatus (12).

12. In the circuit (10) as described in claim 8 the improvement further comprising means (68,70) for purging air from the injection apparatus (12).

13. In the circuit (10) as described in claim 8 the improvement further comprising means (45) for isolating the flow meter (44) and means (48) for passing fuel through said flow meter (44) for the calibration thereof.

14. In the circuit (10) as described in claim 8 including; a recirculation line (34) recirculating fuel to the suction side (23) of said pump (22) and said first deaerator (38) is interposed in the recirculation line (34).

15. In the circuit (10) as described in claim 14 wherein a relief valve (36) is disposed in said recirculation line (34) upstream of said first deaerator (38).

16. In the circuit (10) as described in claim 8 wherein said circuit (10) maintains the flow of fuel at a velocity sufficient to sweep air bubbles in said circuit (10) to said first or said second deaerators (38,56).

17. In the circuit (10) as described in claim 8 the improvement further comprising means (72,74) for pressurizing and isolating the injection apparatus (12) to test said injection apparatus (12) for leakage.

18. In the circuit (10) as described in claim 17 wherein said pressurizing said isolation means includes a selector valve (72) and a pressure line (74) communicating with the pump discharge side (24).

* * * * *